H. W. CONNELL.
DIFFERENTIAL MECHANISM FOR AUTOMOBILES.
APPLICATION FILED NOV. 28, 1911.
1,217,917.
Patented Mar. 6, 1917.
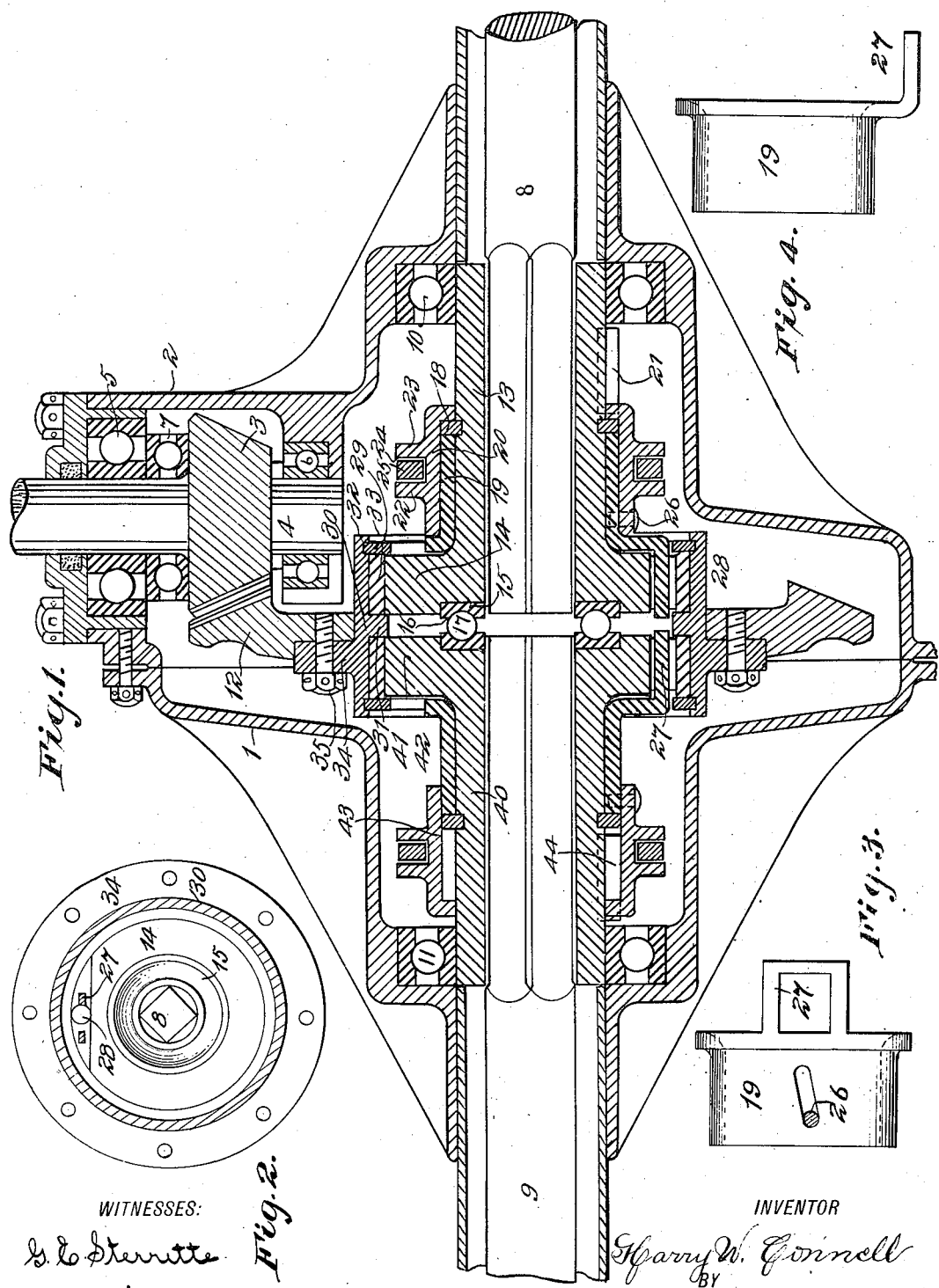
WITNESSES:
INVENTOR
ATTORNEY

UNITED STATES PATENT OFFICE.

HARRY W. CONNELL, OF NEWARK, NEW JERSEY.

DIFFERENTIAL MECHANISM FOR AUTOMOBILES.

1,217,917.      Specification of Letters Patent.      Patented Mar. 6, 1917.

Application filed November 28, 1911. Serial No. 662,849.

*To all whom it may concern:*

Be it known that I, HARRY WESTCOTT CONNELL, a citizen of the United States, and resident of Newark, in the county of Essex, State of New Jersey, have invented certain new and useful Improvements in Differential Mechanism for Automobiles, of which the following is a specification.

In devising the mechanism of which this invention is comprised I have had in mind to overcome the objectionable features of the more common types of differential mechanism particularly the planetary or other multi-geared devices of this general class. In the results of its operation and in its general adaptation and attachment my differential mechanism is not unlike the geared type, but it performs its function with greater ease and accuracy and even is capable of accomplishing results entirely unknown to the heretofore accepted driving mechanisms.

Although providing an independant drive for each wheel of the driving pair, my differential mechanism makes it impossible for the free or coasting wheel to lag behind the effective wheel as the wheel which tends to the slowest motion, will by my device be most effective for tractive exertion.

In turning a sharp corner with a machine fitted with a planetary differential mechanism, the outside wheel, the one that has the greatest distance to travel is the driving or traction wheel, the inside wheel, the one nearest the curb running free on its shaft tends to stand still or even reverse its motion and turn backward. With my device the inside wheel is the driving wheel and my mechanism is conditioned to allow the outside wheel to run freely ahead and as it has a greater distance to go this is as it should be for most satisfactory results.

From this slight description of results it will be readily understood that my device accomplishes two very important functions. One that it makes it possible to drive ahead with either wheel of the driving pair and even though one of the wheels is so badly mired that it exerts no tractive effort it is yet possible to advance.

The other that because of the inability of the inner wheel to stand still or reverse itself and because the outer wheel is free to race ahead to any desired amount skidding while taking a short turn at a high rate of speed is entirely obviated.

Other advantageous features will appear as the specification advances and although they are in the whole too numerous to mention here, I might add a few of the more important such as greater mechanical strength and mechanical efficiency, ease of adjustment and operation and greater simplicity of construction.

I am well aware that there may be objections to my use of the term differential mechanism as the name of my device or as the title of this application, and I am well aware that my device is not a differential mechanism in the most correct sense but as the results obtained are those desired in the ideal differential mechanism and as it is in this capacity that I have found the greatest applicability for my invention I believe that the slight error, if error it may be called can be overlooked.

The following is what I consider the best means of carrying out this invention.

The accompanying drawings form a part of this specification, in which:

Figure 1, is a sectional view of the completed device, showing all of the parts in their operative position.

Fig. 2, is a part removed, it shows in elevation partly in section one of the disks, the ring in which it operates, the roller between the ring and disk, and the cage for changing the location of the roller.

Fig. 3, shows in side elevation, a part removed.

Fig. 4 is also in elevation, it shows the collar 19, this view is taken at right angles to the view shown in Fig. 3.

Similar reference numerals indicate like parts in all the figures where they appear.

Referring to Fig. 1, 1 and 2 indicate the two parts of the casing, this casing is not unlike the ordinary inclosing means for the ordinary type of differential mechanisms though I may find it convenient to somewhat change the dimensions and I prefer to use a casing having a large removable cap which exposes to view the whole interior mechanism. A pinion 3 mounted upon a shaft 4 carried in a series of ball bearings 5 and 6, and held in operable position by a thrust-bearing 7 are in all respects similar to the same members found in the better class of cars, and as they perform no important nor extraordinary function in relation to my invention I will not describe them in detail, nor will I specifically describe the shafts 8 and 9 as I have shown the ordinary shafts used in the well known floating axle type.

Bearings 10 and 11, space for which is provided in the case are also the well known type of ball bearing usually found supporting the outwardly extending ends of the differential mechanism proper, and they together with the bevel gear 12 conclude the list of parts which in my differential mechanisms are exactly similar to those in common use.

At 13 I show a sleeve or cylinder supported at the right end in the bearing 10, the left end is flanged as is shown at 14. Through the longitudinal axis of this sleeve and flange a square hole is produced for the reception of the axle or shaft 8.

In the flange 14 a recess is produced and into this recess a hardened ring 15 is secured. A way 16 in the ring 15 provides a course for a series of balls 17, the purpose of which shall appear later.

About mid-length of the sleeve 13 a shallow groove is produced and I provide a spring ring 18 to fit snugly in this groove.

Between the spring ring 18 and the outer face of the flange 14 a collar 19 is held. This collar is bored to fit freely the sleeve 13 and is of a length sufficiently to be held reliably in place at its inner end by the flange 14, and at its outer end by the spring ring 18.

Fitting snugly over the collar 19 and the spring ring 18 is a thimble 20. This thimble is by means of the key 21 feathered to the sleeve 13, and is by means of the key caused to rotate with the sleeve.

At mid-length of the thimble 20 and about its periphery lugs 22, 23 are formed sufficient distance apart to make a race or groove 24 and a fork 25 fitting into the race 24 is a means by which the thimble 20 is caused to reciprocate axially upon the sleeve 13, 26 indicates a pin secured in the thimble 20 near the inner end. The pin is of a length greater than the thickness of the collar and the free end extends inward toward the axis of the collar fitting freely a partially circumferential way in the collar 19. From this construction it will be observed that the collar 19 and the thimble 20 rotate with the sleeve 13 in positive relation to each other, but when the thimble 20 is reciprocated on the sleeve 13 the collar 19 is advanced or retracted in its relation to the thimble 20.

I have not yet described the projecting end of the collar 19 as it is shown at 27, it is a lip upwardly extending from the inner edge of the collar and turned sharply at right angles at about mid-length. A square hole is produced in the right angle portion and a roller 28 is inserted in the square hole.

Now referring to Fig. 2, it will be seen that the flange 14 is not a complete disk but has a portion cut away and it is upon this portion that the roller 28 rests. A hardened ring 29 completely surrounds the disk 14. This ring is a perfect circle and between the flattened side of the disk 14 and the inner side of the ring 29, the roller 28 and the retaining cage 27 are situated.

A drum 30, a casting which may be of a good grade of iron or steel is at one end turned to receive the ring 29 in snug engagement. At the center but on the inner side a rib 31 is left it is the parting wall or spacer and its functions will be understood by its location. A groove 32 is turned near the outer edge of the drum 30 and into this groove a spring or retaining ring 33 is forced. About the periphery of the drum 30 an outwardly extending lug 34 is cast and it is to this lug by means of the cap screws 35 that the bevel driving gear 12 is attached to the drum, and it is by means of the mechanism just described that the mechanically produced rotation of the gear 12 is transmitted to the driving wheels.

So far I have described but one half of my device but referring to the drawings particularly Fig. 1 it will be seen that the other half of the differential mechanism proper is in all respects similar to that already described, in that it has a sleeve 40, a flange 41, collar 42 operable thereon and thimble 43 feathered by means of the key 44 to the sleeve 40 all in coincidental relation to the exactly similar parts as they appear and operate in the first described half of my device.

The principle upon which this device works is that of a revolving member wedging with more or less firmness between parts having diverging angles.

The hardened disk 14 is free to revolve in the ring 29 in either direction provided the roller 28 is by means of the cage 27 held in a central position upon the flattened portion of the edge of the disk 14, but when the cage is advanced sufficient to allow the roller 28 to move out of the center it then becomes tightly engaged between the inner face of the ring 29 and the smooth flattened face of the disk 14 and the power exerted to turn the ring 29 also serves to pinch the roller 28 more firmly between the ring and the disk, but should the disk advance more rapidly than the ring 29 the roller will then be forced back into its central position and held there by the member 27 and the disk can turn freely; this is what happens when the outside wheel of a pair desires to race. The same thing is true with the opposite pair the disk 41 and the ring adjacent thereto. It will be seen that the slow revolving wheel is the driven wheel, an advantageous condition under many circumstances.

When the driving shaft or pinion 3 is reversed or caused to rotate in the opposite direction it is also necessary to condition the member 28 so that it can operate on the opposite side of the center line, this is accomplished by reciprocating the thimble 20, thereby partly rotating the member 27 allowing the member 28 to advance in a directly opposite direction at the same time preventing it from taking its former position.

Modifications may be made within the scope of the appended claims without departing from the principle or sacrificing the advantages of this invention.

In my experiments I have found that this device can be used very advantageously as a speed reducing mechanism and I propose to make a separate application for its use in that regard as I find a patentable modification is necessary for its most complete application.

In adapting this device for use free rein is allowed the constructor in the location of the bearings as it has been found that a simple plug and socket bearing is sufficient between the two disks.

Another type of cage may be used.

From the description and drawings it is obvious that any other type of axle can be used or with but slight modifications my differential mechanism can be located in the hub of the wheel as it lends itself to be readily adjusted to any style of drive where the use of a differential mechanism is of an advantage.

Having carefully and fully described my invention what I claim and desire to secure by Letters Patent is:—

1. In a differential for automobiles, a drum, a bevel gear detachably secured to the periphery of said drum, a plurality of rings secured to the inner face of said drum, an inwardly extending lug separating said rings, a plurality of disks each having a portion of its periphery flattened and rotatable within said rings, a roller between the flattened edges of each disk and a ring adjacent thereto and adapted to force the periphery of said disk into engagement with said ring and a cage for adjusting the position of said roll upon the edge of said disk.

2. A differential mechanism having a plurality of shafts in alinement, a disk secured upon the adjacent end of each said shaft, each of said disks having a single flattened portion in its periphery, and an anti-friction device between said disks, a drum surrounding both of said disks, and a roller upon the flattened surface of each said disks, and adapted to engage said disk with said drum for the purpose set forth.

Signed at New York city, N. Y., this 30th day of October, 1911 A. D. in the presence of two witnesses.

H. W. CONNELL.

Witnesses:
H. F. CONNELL,
ARTHUR PHELPS MARR.